Jan. 20, 1931.  C. H. CARLSON  1,789,925
EXTENSIBLE AND RETRACTABLE AIRFOIL
Filed May 21, 1929    2 Sheets-Sheet 1
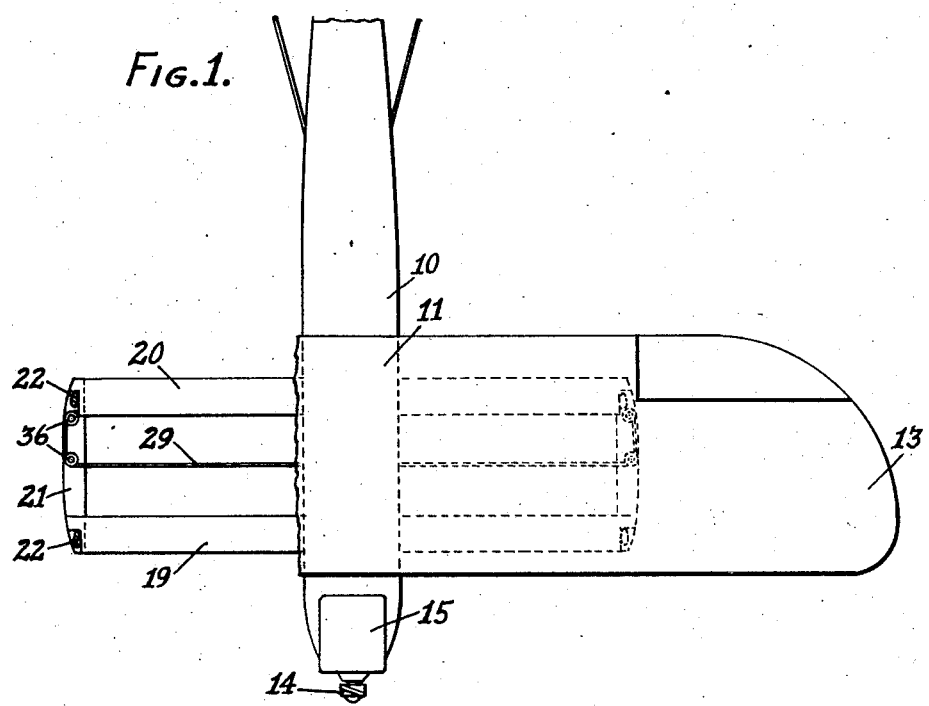
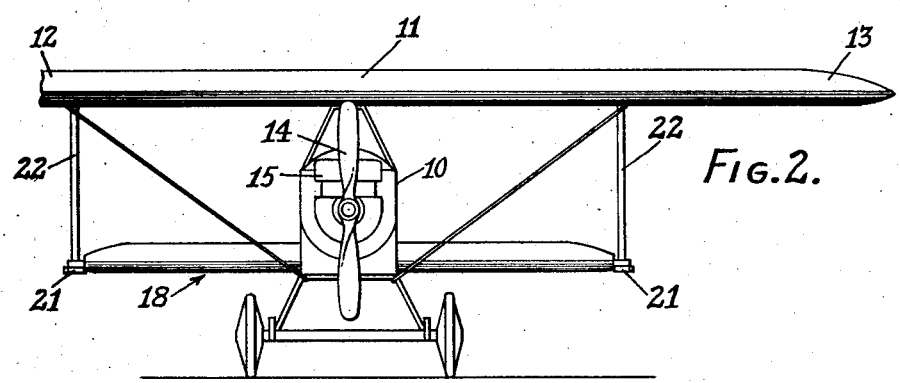
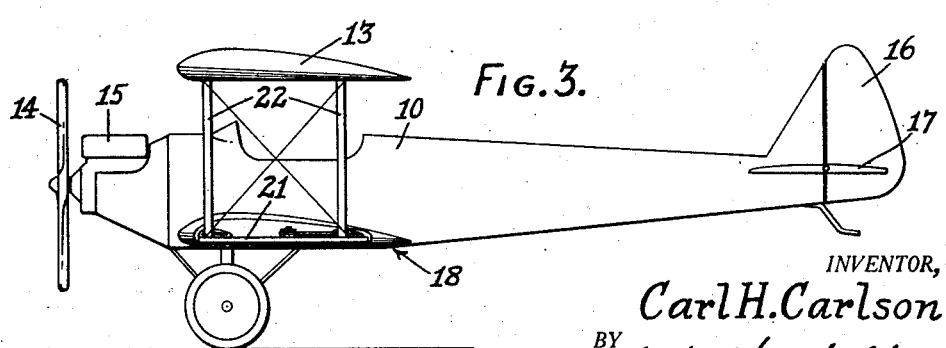
INVENTOR,
Carl H. Carlson
BY
ATTORNEY.

Jan. 20, 1931.  C. H. CARLSON  1,789,925

EXTENSIBLE AND RETRACTABLE AIRFOIL

Filed May 21, 1929    2 Sheets-Sheet 2

INVENTOR,
Carl H. Carlson
BY
ATTORNEY.

Patented Jan. 20, 1931

1,789,925

UNITED STATES PATENT OFFICE

CARL H. CARLSON, OF LOS ANGELES, CALIFORNIA

EXTENSIBLE AND RETRACTABLE AIRFOIL

Application filed May 21, 1929. Serial No. 364,711.

My invention relates to airplane construction and more particularly to an extensible and retractable airfoil adapted to vary the effective wing surface of an airplane.

As is well known, by those familiar with the art, a direct relationship exists between the top speed or normal flying speed and the landing speed of any particular type of airplane. It is also well known that an inverse relationship exists between the total wing surface or airfoil surface and the attainable speed of airplanes in general, any excess of such surface having a tendency to retard an airplane when traveling at high speed and any deficiency of such surface making impossible a reduction of speed suitable for safety in taking off or landing.

The general object of my invention is to provide a variable airfoil which may be extended so as to increase the total wing surface of an airplane with which it is equipped, and may be retracted and folded into the fuselage so as to reduce the total wing surface.

The more particular object of my invention, therefore, is to provide means for augmenting the wing surface of an airplane, so that a reduction in take-off speed and landing speed may be obtained; to provide means for reducing the wing surface of an airplane when it is high above ground, so that its top speed may be increased, and to increase the speed range of an airplane, especially of the biplane type.

Other objects and advantages will appear hereinafter and while I show herewith and will describe a preferred form of construction, I desire it to be understood that I do not confine my invention to such preferred form but that various changes and adaptations may be made therein without departing from the spirit of my invention as hereinafter claimed.

Referring to the drawings which accompany this specification and form a part thereof.

Fig. 1 is a plan view of a monoplane which is equipped with an auxiliary airfoil embodying the principles of my invention, the right wing thereof being shown broken off close to the fuselage and the auxiliary airfoil being shown in its retracted condition.

Fig. 2 is a front view of the airplane shown in Fig. 1 with the auxiliary airfoil in its extended condition.

Fig. 3 is a left side view of the airplane shown in Figs. 1 and 2.

Figure 4:
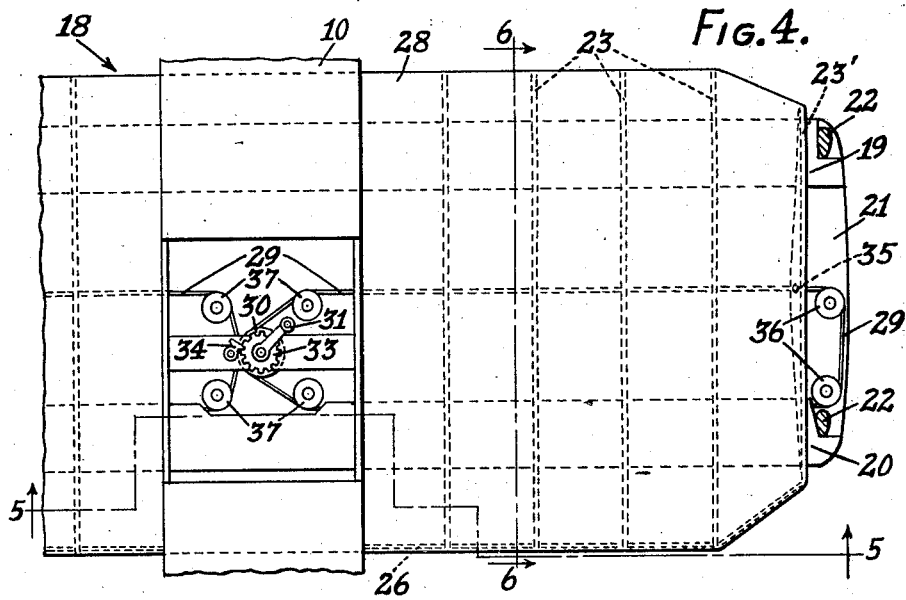
Fig. 4 is an enlarged fragmentary plan view of the fuselage and auxiliary airfoil of the airplane shown in Figs. 1, 2 and 3, the right end only of the auxiliary airfoil being shown complete.

That airplane shown in the drawings, by way of illustration, is intended to represent a monoplane of conventional design having a fuselage 10 equipped in the usual way with an airfoil 11, comprising a right wing 12 and a left wing 13, with a propeller 14 driven by an engine 15 in the front end thereof and with the usual rudder 16 and elevator 17, forming the empennage thereof. The new feature, in which my invention resides, is an auxiliary airfoil 18, fixed to the lower part of the fuselage 10 in parallel relation to the main airfoil 11, said auxiliary airfoil being approximately one-half the length of the main airfoil and having a variable surface, as presently will appear.

The auxiliary airfoil comprises a pair of parallel spars 19 and 20 of equal length which are run through the lower part of the fuselage and the middle parts of which are fixed rigidly therein so that their ends extend laterally at equal distances therefrom, said ends on each side being connected by a horizontal strut 21 which in turn is connected to the main airfoil by a pair of vertical or interplane struts 22. Spars 19 and 20, preferably, are made of duralumin, or other light metal, drawn to a shape having an airfoil cross-section, as shown in Fig. 6, or a streamline cross-section, but may also be built up with internal trusses to either of those shapes.

Figure 6:
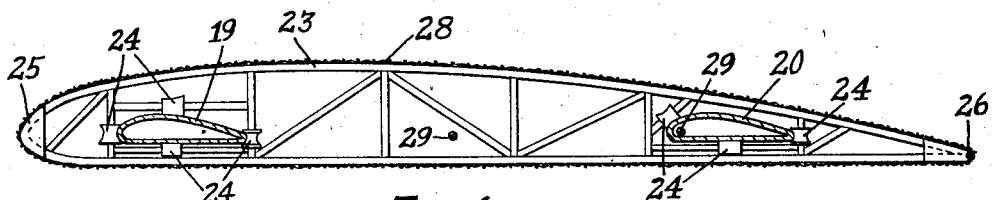
Fig. 6 is a further enlarged sectional view of the auxiliary airfoil shown in Fig. 5, the section being taken on line 6—6 of that figure.
Figure 7:
Fig. 7 is an enlarged detail view of the toothed wheel and detent associated with the winding drum of the auxiliary airfoil.

A series of equally spaced wing ribs 23, each of which is built up of light framework and trussed in the usual way, as shown in Fig. 6, are mounted on spars 19 and 20, on either side of the fuselage, between it and horizontal struts 21, said ribs 23, except the end ones 23', which are made somewhat smaller than the others to provide a suitable taper to the ends of the auxiliary airfoil, being equipped with rollers 24 adapted to run on spars 19 and 20 so as to reduce the friction between them. Suitable webbing (not shown) is attached to the leading ends 25 of the wing ribs and a flexible wire or cable 26 is attached to the trailing ends thereof to connect and hold them in properly spaced relation to each other and to reinforce the leading and trailing edges of the auxiliary airfoil. Intermediate strips of webbing (not shown) also may be attached to the wing ribs to further reinforce the airfoil.

Suitable openings 27 are made in the sides of the fuselage to receive wing ribs 23, when they are bunched together, and a tough flexible fabric 28 is fixed around these openings, stretched tightly over the wing ribs, while in their extended positions and fastened thereto, said fabric having been treated with waterproofing material so as to make it impervious to air. Obviously the wing ribs are thus adapted to be shifted on spars 19 and 20, toward the fuselage and bunched in openings 27 therein, or toward said struts 21, the fabric holding in accordion pleats between the ribs in the former case and stretching between them to form an extended airfoil in the latter case.

Any one of several means may be employed for extending and retracting the auxiliary airfoil such as a framework adapted to operate on the principle of a lazy tongs or a series of pneumatic telescoping tubes or, as is shown in the drawings, a pair of cables 29 winding on a drum 30 which may be turned by a crank 31 fixed on the drum shaft 32 and may be held from turning back by a toothed wheel 33 also fixed on the drum shaft, and a reversible detent 34 pivotally attached to the framework adjacent thereto, so as to engage said toothed wheel. Each cable 29 is attached to the middle point of an end rib 23' as at 35, one of the cable ends being run around pulleys 36 on horizontal spar 21 into rear spar 20 and longitudinally therethrough to the middle thereof where an opening is made through which it is brought out and attached to the drum. The other end of the cable is run through the middle of wing ribs 23 so as to approach the drum from a direction opposite to that of the first end and is attached thereto in the same manner so that when the drum is turned one end of the cable winds and the other unwinds while the cable, as a whole, is maintained at a uniform tension. Both ends of the cable are run around guide pulleys 37 which are adapted to direct them onto different sections of the drum so as to prevent interference of the two ends and overlapping of the turns of either end.

Figure 5:
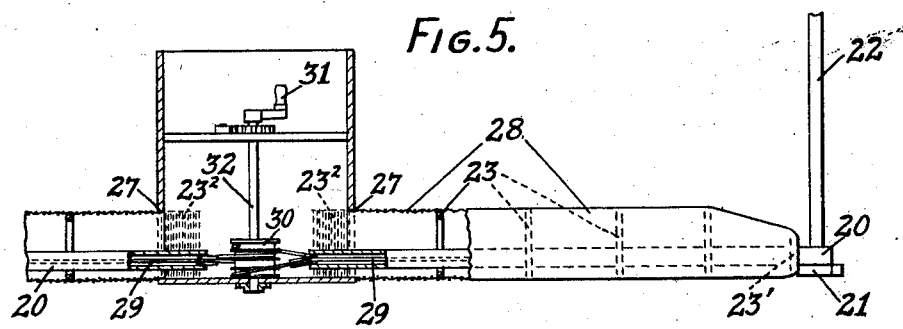
Fig. 5 is a sectional view of the fuselage and airfoils shown in Fig. 4, the section being taken approximately on line 5—5 of that figure.

The operation of my auxiliary airfoil will be most readily understood by reference to Figs. 1, 2, 4 and 5. Before taking off drum 30 is turned in a direction which causes cables 29 to pull the end wing ribs 23' outwardly into contact with horizontal struts 21, thus bringing the auxiliary airfoil into its extended condition as shown in Figs. 2, 4 and 5. After the airplane has reached a suitable height for top speed the drum is turned in a reverse direction which causes the cables to pull end ribs 23' toward the fuselage thus retracting the auxiliary airfoil and folding the several ribs 23, together with the fabric 28 attached to them, into openings 27 of the fuselage, as indicated by dotted lines $23^2$ in Fig. 5. In this folded condition only spars 19 and 20 and struts 21 of the auxiliary airfoil are left exposed to view and in a position which may produce a relatively small drag and an appreciable lift. When the airplane is about to make a landing, of course, the auxiliary airfoil is again extended as described for taking off.

While I have shown my device as an auxiliary airfoil connected to a monoplane, thus practically converting it into a biplane, obviously the same principles may be applied to airfoils on any type of airplane.

Having thus illustrated and described my invention, I claim:

1. In an airplane, an airfoil comprising a pair of parallel spars made with lifting airfoil or streamline cross-section, said spars being fixed in spaced relation to each other to the fuselage; connecting struts at the ends of said spars; a series of wing ribs mounted on said spars so as to be movable thereon between said connecting struts and the fuselage; rollers fixed in said wing ribs so as to run on said spars; a flexible and waterproof covering-fabric attached to said wing ribs so as to stretch between them when they are extended and to fold between them when they are retracted; cables attached to the outermost of said wing ribs and a drum mounted in the fuselage and having the ends of said cables attached thereto, said drum being adapted to wind and unwind the ends of said cables so as to extend or retract said wing ribs.

2. In combination with a monoplane, an auxiliary airfoil fixed to the fuselage thereof, in parallel spaced relation to the airfoil thereof, said auxiliary airfoil, comprising a pair of parallel spars made with lifting airfoil or streamline cross-section; connecting struts at the ends of said spars holding them in spaced relation to each other; a series of wing ribs mounted on said spars so as to be slidable thereon between said connecting struts and the fuselage; a flexible covering-fabric attached to said wing ribs, so as to stretch between them when they are extended and to fold them when they are retracted, and means, operable from the fuselage, for extending and retracting said wing ribs.

CARL H. CARLSON.